June 21, 1949.  G. M. WALTON  2,473,979
LIQUID FILTER ELEMENT
Filed March 15, 1945
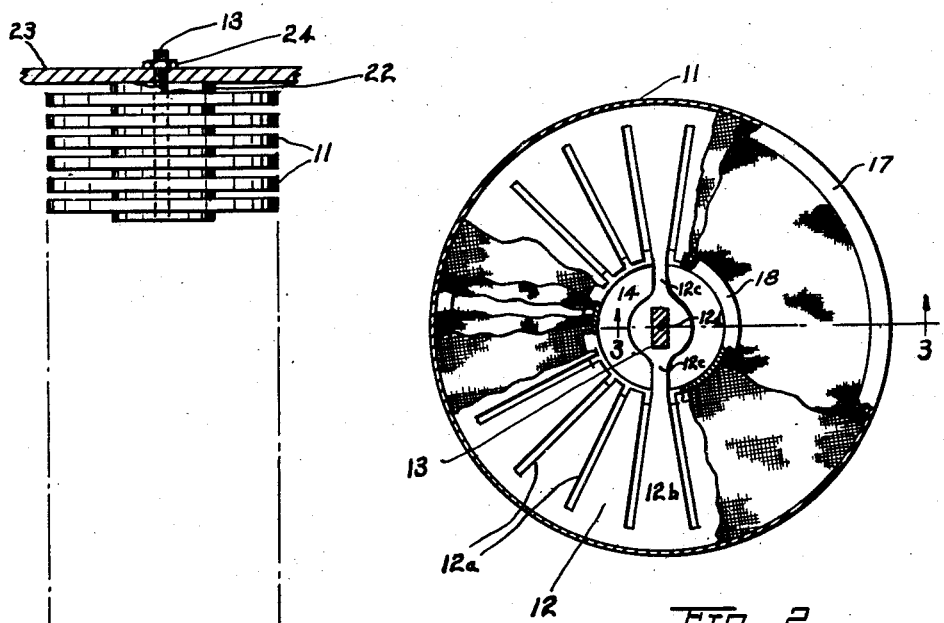
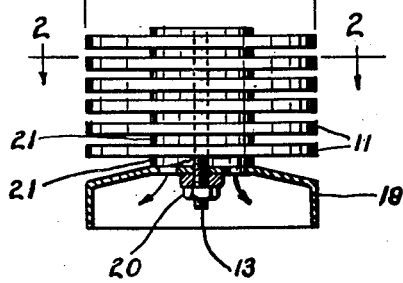
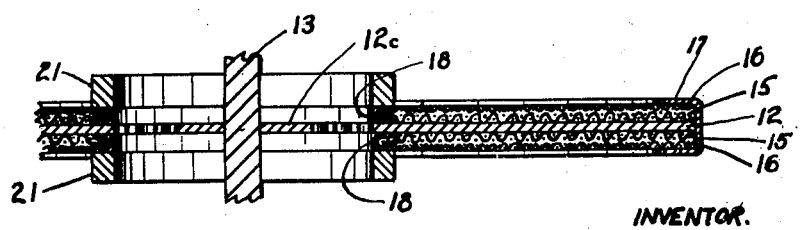
INVENTOR.
GEORGE M. WALTON.
BY Hyde and Meyer
ATTORNEYS.

Patented June 21, 1949

2,473,979

UNITED STATES PATENT OFFICE 2,473,979

LIQUID FILTER ELEMENT

George M. Walton, Shaker Heights, Ohio, assignor to Air-Maze Corporation, Cleveland, Ohio, a corporation of Delaware Application March 15, 1945, Serial No. 582,919

3 Claims. (Cl. 210—169)

1

This invention relates to improvements in hollow-leaf filtering packs and to a manner of assembling the same.

This present invention relates to improvements in a filtering element for use in a filter of the type shown in United States Letters Patent No. 2,431,782, granted December 2, 1947, to George M. Walton and Henry W. Matlock, although it will be understood that the construction of filter elements disclosed herein may be used in any filtering device regardless of the type of housing used.

One of the objects of the present invention is to provide filter packs adapted to be assembled in a definitely oriented relationship with novel means for holding the packs assembled, which means dispenses with the use of a central perforated tube which is often found in devices of this sort. The present invention provides a structure which is cheaper than that shown in the above-mentioned patent and one which is entirely satisfactory in use.

Further details of construction and advantages of the present invention will be apparent from the accompanying drawings and specification, and the essential features thereof will be set forth in the appended claims.

In the drawings,

Fig. 1 shows a plurality of my improved filtering packs in assembled relationship for use in a filter of the type shown in the patent above referred to;

Fig. 2 is an enlarged view of one of the packs taken along the line 2—2 of Fig. 1 with parts broken away to more clearly show the construction; while Fig. 3 is a sectional view taken along the line 3—3 of Fig. 2 and somewhat enlarged and distorted as to the thickness of materials used for the purpose of clearly illustrating the construction.

The construction of the individual filter packs of the hollow-leaf type of the present application is closely related to that shown in the above-mentioned patent but in the present instance, each filter pack has been modified so that a plurality of the packs may be assembled to provide a large area in a liquid filter and dispense with the use of a central perforated tube such as that shown in the above-mentioned patent. In the present device, a plurality of filtering packs 11 are shown in assembled relationship, there being any number necessary to provide the filtering area required in a particular case. I have shown a rather large filtering device illustrating only a

2 few of the filter packs 11 at the top and bottom of the device and indicating by dot-dash lines that others of the same character may be piled one upon the other until the required number have been provided. Each of these filter packs 11, as shown more clearly in Figs. 2 and 3, comprises a central separator member 12 having radially extending slots 12a closed at their radially outer ends and open at their inner ends to provide for proper flow of liquid as later described. These separator members have a plurality of the tongues 12b (between adjacent slots 12a) extended inwardly to the center of the pack so as to provide a bridge 12c entirely across the central opening of the pack. In the present embodiment I have shown diametrically opposite tongues extended to form a diametrically positioned bridge, but it is obvious that three tongues might be provided spaced preferably 120 degrees apart or obviously four tongues could be provided, there being another set at right angles to the portions 12c shown in Fig. 2. These variations seem obvious and are, therefore, not illustrated. In the center of the bridge 12c, there is provided an opening 12d through which a securing member such as the bolt 13 may extend.

Some means is provided for orienting the bridges 12c so that they will register with each other throughout the length of the filtering device as shown in Fig. 1. This is desirable so as to insure that the generally semicircular passageways 14 may be open from end to end of the device of Fig. 1. Various forms of orientation are possible, but I have shown a very simple one in that the openings 12d are of rectangular form adapted to snugly embrace a bolt 13 rectangular in section. This insures that all of the bridges 12c will be in alinement when the packs are assembled on the bolt 13.

On each side of the separator member 12 is an annular set of foraminate material such as the coarse screens 15 illustrated. Each of these screens 15 is in turn covered by a finer annular screen 16 of the mesh or size of openings necessary to provide the required filtering media. The purpose of the coarse material 15 is to give a uniform support to the fine screens 16 and at the same time to provide for lateral flow of the filtrate after it passes through the screen 16 so that it may readily flow to the radial passageway 12a and thence radially inwardly to the central passageway 14. Means is provided for fixing the screens 15 and 16 to the separator 12 so as to form a unitary pack. In the present form, I have shown a grommet 17 of metal or the like bent generally in channel shape and forming an outer ring clamped down upon the outer faces of the screens 16 and binding all four of the screens to the separator member 12. Preferably, but not necessarily, the inner edges of the screens 15 and 16 are bound to prevent loose pieces of wire being carried along with the filtrate. To this end I have provided grommets 18 each binding one of the screens 15 and one of the screens 16 at their inner peripheries.

When a plurality of packs are to be assembled, as shown in Fig. 1, the pilot member 19, or other suitable securing or abutment member, is placed on the lower end of rod 13 and secured there by means of nut 20 threaded on the rod. If desired, the pilot 19 may be threaded on the rod in which case the nut 20 serves as a lock nut. A plurality of the packs 11 are then assembled on the rod 13 with suitable spacing rings 21 located between adjacent packs. In the top of the assembled apparatus, as shown in Fig. 1, a solid washer 22 may be threaded on rod 13 and the device may then be assembled with the rod 13 passing through a portion of the housing 23 which is equivalent to the housing 15 shown in the above mentioned patent. A nut 24 is then secured on the extreme end of rod 13 and pulled down tightly to hold all of the packs assembled as best seen in detail in Fig. 1. At the same time this secures the assembled filter packs to the housing portion 23 as will be readily apparent.

The device here described is not adapted for use of the by-pass valve shown in the above mentioned patent, but might be modified to provide such a by-pass where one is required as will be readily understood.

The flow in a filter of this type is first through the screens 16 and then through the hollow center of each pack toward the central passageways 14 and then downwardly to discharge in the direction of the arrows indicated in Fig. 1. A suitable housing to compel such a flow is shown in the above mentioned patent wherein the outlet for clarified fluid has the reference character 13.

What I claim is:

1. A liquid filter element comprising a base member having a central opening and radially extending passageways slotted through said base member and communicating with said central opening thus providing tongues between adjacent passageways, a plurality of said tongues extending uninterruptedly across said opening to provide a bridge, filter material mounted on said base member and surrounding said opening, and there being a hole through said bridge whereby a plurality of said elements may be mounted on a rod passing through said hole.

2. Liquid filter construction comprising a plurality of hollow leaf packs, each pack having a base member having a central opening and radially extending passageways slotted through said base member and communicating with said central opening thereby providing tongues between adjacent passageways, a plurality of said tongues extending uninterruptedly across said opening to provide a bridge leaving part of said opening unobstructed, filter material covering said base member from the periphery of said opening to the outer edge of said member, there being a hole through each bridge, a plurality of said packs being assembled in generally parallel relationship with their openings alined, there being an uninterrupted spacer ring between each pair of adjacent packs, said rings having outside dimensions extending slightly beyond the periphery of said opening, a rod passing through said holes, and means clamping said rings and packs together, whereby said rings press said filter material against said base member adjacent the peripheries of said pack openings.

3. The combination of claim 2 wherein said holes are noncircular and all of the same shape and positioned similarly with respect to the associated bridge, and said rod being non-cylindrical and conforming to said shape.

GEORGE M. WALTON.

REFERENCES CITED

The following references are of record in the file of this patent:

UNITED STATES PATENTS

| Number | Name | Date |
|---|---|---|
| 1,249,835 | Salisbury | Dec. 11, 1917 |
| 1,641,485 | Heftler | Sept. 6, 1927 |
| 1,649,822 | Furbish | Nov. 22, 1927 |
| 1,726,035 | Loew | Aug. 27, 1929 |
| 1,926,557 | Perkins | Sept. 12, 1933 |
| 1,940,208 | Dieman | Dec. 19, 1933 |
| 2,359,475 | Gauthier | Oct. 3, 1944 |

FOREIGN PATENTS

| Number | Country | Date |
|---|---|---|
| 113,788 | Australia | Aug. 29, 1941 |
| 403,107 | France | Sept. 16, 1909 |